(12) United States Patent
Kinzer

(10) Patent No.: US 7,219,413 B1
(45) Date of Patent: May 22, 2007

(54) ADJUSTING SYSTEM AND METHOD FOR HEAD SLIDER MOUNTING REGIONS ON HEAD SUSPENSIONS

(75) Inventor: Larry M. Kinzer, Sioux Falls, SD (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 241 days.

(21) Appl. No.: 10/379,245

(22) Filed: Mar. 4, 2003

Related U.S. Application Data

(60) Provisional application No. 60/362,797, filed on Mar. 8, 2002.

(51) Int. Cl.
*G11B 5/127* (2006.01)
*H04R 31/00* (2006.01)

(52) U.S. Cl. .............. 29/603.1; 29/603.12; 360/234.5; 360/235.8; 360/245.9

(58) Field of Classification Search ............. 29/603.07, 29/603.1, 603.12; 360/234.5, 235.8, 245.9, 360/245.8
See application file for complete search history.

(56) References Cited

U.S. PATENT DOCUMENTS

| | | | |
|---|---|---|---|
| 3,311,733 A | 3/1967 | Bitzer, Jr. | |
| 4,186,039 A | 1/1980 | Bache et al. | |
| 4,520,254 A | 5/1985 | Steiger et al. | |
| 4,603,567 A | 8/1986 | Smith et al. | |
| 4,777,544 A | 10/1988 | Brown et al. | |
| 5,228,324 A | 7/1993 | Frackiewicz et al. | |
| 5,256,850 A | 10/1993 | Maegawa et al. | |
| 5,297,413 A | 3/1994 | Schones et al. | |
| 5,303,108 A | 4/1994 | Higashionji et al. | |
| 5,341,256 A | 8/1994 | Murata et al. | |
| 5,341,303 A | 8/1994 | Fouroudastan et al. | |

(Continued)

FOREIGN PATENT DOCUMENTS

JP     5-7572     1/1975

(Continued)

OTHER PUBLICATIONS

"lobal spacecraft attitude control using magnetic actuators"; Astolfi, A.; Lovera, M.; American Control Conference, 2002. Proceedings of the 2002 vol. 2; May 8-10, 2002; pp. 1331-1335.*

(Continued)

*Primary Examiner*—Paul Kim
(74) *Attorney, Agent, or Firm*—Faegre & Benson LLP

(57) ABSTRACT

A method for adjusting static attitude of a head suspension is provided that includes providing an adjustment pin and adjusting the static attitude of a supported head suspension by contacting the head suspension with the adjustment pin to cause a predetermined attitude change in the head suspension. Once adjusted, the head suspension is exposed to heat for a predetermined period of time. The adjustment pin is manipulated, such as by pivoting, translation or both, about the head slider mounting region to cause angular reorientation of the region prior to exposure to the heat. Measurement of the static attitude of the head suspension may be performed before adjusting, after adjusting or both. A static attitude adjustment system is also provided including a manipulatable adjustment pin to be placed in contact with the head suspension and a heat source configured to expose the suspension to heat.

22 Claims, 8 Drawing Sheets

U.S. PATENT DOCUMENTS

| | | | |
|---|---|---|---|
| 5,347,415 A | 9/1994 | Murata et al. | |
| 5,537,276 A | 7/1996 | Mukae et al. | |
| 5,572,895 A | 11/1996 | Hoving et al. | |
| 5,588,200 A * | 12/1996 | Schudel | 29/603.01 |
| 5,608,590 A | 3/1997 | Ziegler et al. | |
| 5,682,780 A | 11/1997 | Girard | |
| 5,844,751 A | 12/1998 | Bennin et al. | |
| 6,011,239 A * | 1/2000 | Singh et al. | 219/121.6 |
| 6,057,975 A | 5/2000 | Yaeger et al. | |
| 6,072,151 A | 6/2000 | Jurgenson et al. | |
| 6,134,083 A * | 10/2000 | Warmka | 360/235.6 |
| 6,154,952 A * | 12/2000 | Tangren | 29/603.04 |
| 6,366,430 B1 * | 4/2002 | Narayan et al. | 360/244.9 |
| 2003/0154005 A1 | 8/2003 | Wong et al. | |

FOREIGN PATENT DOCUMENTS

| | | | |
|---|---|---|---|
| JP | 53-149107 | | 12/1978 |
| JP | 57-167163 | | 10/1982 |
| JP | 58-88873 | | 5/1983 |
| JP | 59-001920 | | 1/1984 |
| JP | 59-25929 | | 2/1984 |
| JP | 60-244495 | | 4/1985 |
| JP | 60-147982 | | 8/1985 |
| JP | 61-189463 | | 11/1986 |
| JP | 01-227279 | | 11/1989 |
| JP | 03-192586 | | 8/1991 |
| JP | 04-310614 | | 2/1992 |
| JP | 5-159501 | | 7/1993 |
| JP | 05-189906 | | 7/1993 |
| JP | 07169217 A | * | 7/1995 |
| JP | 2000-339894 | | 5/1999 |
| NL | 92-01768 | | 6/1993 |

OTHER PUBLICATIONS

Laser Gram Load Adjust for Improved Disk Drive Performance; Singh, Gurinder, Wu, Xiao and Brown, Byron; pp. 1-10; Jul. 17, 2000.

U.S. Appl. No. 60/330,893, filed Nov. 2, 2001, Wong et al.

* cited by examiner

ADJUSTING SYSTEM AND METHOD FOR HEAD SLIDER MOUNTING REGIONS ON HEAD SUSPENSIONS

This application claims the benefit of a U.S. provisional patent application Ser. No. 60/362,797, filed on Mar. 8, 2002, and entitled ADJUSTING SYSTEM FOR HEAD SLIDER MOUNTING REGIONS ON HEAD SUSPENSIONS.

FIELD OF THE INVENTION

This invention relates to adjusting systems for adjusting the static attitude of a head suspension and methods related thereto.

BACKGROUND OF THE INVENTION

Head suspensions are well known and commonly used within dynamic magnetic or optical information storage devices or drives with rigid disks. The head suspension is a component within the disk drive that positions a magnetic or optical read/write head over a desired position on the storage media where information is to be retrieved (read) or transferred (written). Head suspensions for use in rigid disk drives typically include a load beam that generates a spring force and that supports a flexure to which a head slider having a read/write head is to be mounted. The load beam includes a mounting region at a proximal end, a rigid region at a distal end, and a spring region between the rigid region and the mounting region for providing the spring force. Head suspensions are normally combined with an actuator arm or E-block to which the mounting region of the load beam is mounted with a base plate so as to position (by linear or rotary movement) the head suspension, and thus the head slider and read/write head, with respect to data tracks of the rigid disk.

The rigid disk within a disk drive rapidly spins about an axis, and the head slider is aerodynamically designed to "fly" on an air bearing generated by the spinning disk. The spring force (often referred to as the "gram load") generated by the load beam urges the head slider in a direction opposing the force generated by the air bearing. The point at which these two forces are balanced during operation is the "fly height" of the head slider.

The flexure typically includes a head slider mounting region to which a head slider is attached. The flexure attached to the load beam provides a resilient connection between the slider and the load beam, and permits pitch and roll motion of the head slider and read/write head as they move over the data tracks of the disk in response to fluctuations in the air bearing caused by fluctuations in the surface of the rigid disk. Head suspension flexures can be provided in numerous ways, including designs in which the load beam and flexure are formed integrally with one another and designs in which the flexure is a separate piece from the load beam. One design includes a flexure having a resilient tongue and two resilient spring arms. The head slider is supported on the resilient tongue (i.e., the head slider mounting region), which is in turn supported between the spring arms. The spring arms are connected to a flexure mounting region, which is in turn connected to the load beam.

The gram load provided by the spring region of the load beam is transferred to the flexure via a dimple that extends between the rigid region of the load beam and the flexure. The dimple may be formed or mounted on either the load beam or the flexure. The spring arms allow the tongue of the flexure to gimbal in pitch and roll directions to accommodate surface variations in the spinning magnetic disk over which the slider is flying. The roll axis about which the head slider gimbals is a central longitudinal axis of the head suspension. The pitch axis about which the head slider gimbals is perpendicular to the roll axis. That is, the pitch axis is transverse to the longitudinal axis of the load beam, and crosses the roll axis at or around the head slider.

In order to store and retrieve data from magnetic or optical disks on which data is densely packed, it is necessary for the head slider to fly closely above the surface of the spinning data disk (on the order of 0.1 µm) without colliding with the disk ("crashing"). Further, because of the dense packing of data on magnetic or optical disks, it is important for the read/write head attached to the head slider to be able to read from or write to a relatively small area or spot on the disk.

In relation to this, important performance characteristics of a head suspension include the fly height at which the head suspension positions a head slider and the positional orientation of the head slider in relation to the spinning data disk when the head suspension is in a "loaded" state (i.e. under the influence of the balanced forces created by the spring force and the air bearing). The head slider is designed to fly at a predetermined orientation, typically with its bottom surface or a portion thereof arranged generally parallel with the surface of the disk, and this orientation is often referred to as the "dynamic attitude".

When the head suspension is not actually flying over a spinning disk, the loaded state of the head suspension can be simulated by applying a force in the same direction as the air bearing force at a point on the head suspension other than to the slider bond pad where the head slider would be attached (or, if the slider is attached, other than to the head slider). This force is applied to lift the slider bond pad to its loaded position at the fly height. The orientation or attitude of the slider bond pad under this simulated loaded state is referred to as "static attitude." The difference or bias between the dynamic attitude and the static attitude can be measured for a given head suspension so that a measurement of the static attitude, which can be an easier measurement to make than dynamic attitude, can be used to determine dynamic attitude for a given head suspension. In other words, a head suspension typically has a predetermined static attitude that can be used to assess the dynamic attitude of a head slider attached to the head suspension during normal operation of a disk drive.

Static attitude of a head slider bond pad can be measured with reference to pitch and roll axes of the head suspension. Roll is a rotation of the slider bond pad about the roll axis of the head suspension and pitch is a rotation of the slider bond pad about the pitch axis of the head suspension. Deviations from the desired static attitude about the roll axis can be referred to as roll errors, while deviations from the desired head slider attitude about the pitch axis can be referred to as pitch errors. Pitch and roll errors in static attitude can be caused by manufacturing variations of the head suspension, handling of the head suspension and related components during and after manufacturing, or contamination of the head suspension by airborne foreign matter.

If pitch and/or roll errors exist in the static attitude of a head suspension, there is a greater possibility that errors will exist in the dynamic attitude of the head slider, and that the head slider might crash into the disk. Such crashes are generally undesirable. Further, errors in static attitude of the head slider can cause the read/write head to be out of proper orientation to the surface of the disk or further from the disk surface than it is designed to be. As such, the read/write head may not be able to "focus" on as small an area or spot on the disk as is necessary to efficiently transfer data to or from the disk. This can degrade disk drive performance.

In addition, it may be desirable to adjust the static attitude of a head suspension from a nominal orientation to impart a desired pitch and/or roll bias into the head suspension. In so far as these biases represent incremental changes in pitch and roll static attitude imparted to the head suspension, these too can be viewed as pitch and roll corrections, and the differences between nominal and desired attitude can again be referred to as pitch and roll errors.

Because of the importance of correct head slider attitude, various methods exist for measuring and adjusting pitch and roll parameters to obtain appropriate static attitude. Such methods are disclosed in, for example, U.S. Pat. No. 5,682,780, issued Nov. 4, 1997 to Girard for "Gram Load, Static Attitude And Radius Geometry Adjusting System For Magnetic Head Suspensions." This patent is commonly owned by the assignee of the present application.

One method of correcting errors in the static attitude involves mechanically twisting and/or bending the head suspension to alter the profile of the load beam. In such a method, the profile of the load beam can be altered to support the flexure at an attitude to the disk surface that compensates for any errors in the static attitude of the head suspension. That is, the load beam can be bent about an axis perpendicular to the longitudinal axis of the load beam to account for pitch errors in the static attitude of the head suspension. The load beam can also be twisted about its longitudinal axis to account for roll errors in the static attitude. Similarly, the flexure can be mechanically bent and twisted to try to correct static attitude errors.

Adjusting the head suspension in this way, however, can negatively affect other head suspension parameters, such as the fly height, gram load, and overall resonance profile of the head suspension. In particular, bending the head suspension to affect pitch static attitude also affects gram load, resonance, and head lift height, while twisting the head suspension to correct roll static attitude affects head suspension resonance and introduces vibratory motion in the off-track direction, which can negatively impact disk drive performance. Such mechanical adjustments can also be undesirable due to the amount of forming required to get an appropriate adjustment in static attitude. Moreover, it can be difficult to properly mechanically deform head suspension components due to their relatively small size, which limits the size and operating room for tools used to perform the mechanical adjustments.

Further, it is known to form electrical leads on the load beam or the flexure for carrying electronic read/write signals from the read/write head to data electronics. It can be difficult to mechanically alter the profile of the head suspension without adversely affecting the electrical leads. Electrical leads can also make it difficult to engage tooling with the suspension components to make a static attitude adjustment.

Mechanically adjusting head suspension static attitude can also be inefficient in terms of the precision with which static attitude can be corrected, and in the cycle time it takes to correct the static attitude of an individual head suspension. It is a general industry trend to more densely pack information onto a magnetic disk so as to be able to make disk drives smaller without impacting the amount of data that can be stored in the drive. This necessitates smaller disk drive components, including smaller head suspensions. As data density increases and head suspension size decreases, it becomes increasingly important that the head slider be at the desired attitude when at the fly height, and acceptable tolerances on head suspension static attitude are reduced. Current methods for correcting deviations in static attitude thus may not provide sufficiently fine corrections to account for decreased static attitude tolerances. This can be particularly true when the static attitude correction occurs in individual components of the head suspension prior to mounting them together, since additional errors may be introduced in the mounting process.

Moreover, the conventional static attitude adjustment methods described above are typically performed along with head suspension load beam adjustments to gram load, and mixing the two adjustment processes can create longer feedback loops in the manufacturing process, which increases part cycle time. Mixing the two adjustment processes can also lead to less accurate static attitude adjustments, which negatively impacts part yield.

Another consideration in making adjustments to the static attitude of a head suspension involves the provision of limiters on the suspension. Often, movement limiters are provided on the flexure, load beam or other head suspension component to limit movement of the head slider during shock loads and other potentially catastrophic events. Such limiters may include tabs that surround a component, such as tabs on the load beam that surround the tongue or gimbal portion of the flexure, so that head slider movement is constrained within a predetermined distance toward the disk, away from the disk, or both. During conventional static attitude adjustment, these limiters may be damaged or impaired. Alternatively, use of conventional methods may be inhibited due to the presence of the limiters.

SUMMARY OF THE INVENTION

A method for adjusting the static attitude of a head suspension is provided including providing an adjustment member and adjusting the static attitude of a supported head suspension by contacting the head suspension with the adjustment member to cause a predetermined attitude change in the head suspension. In addition, the head suspension is exposed to heat for a predetermined duration at a predetermined intensity. A heat source is provided for producing the heat. In a preferred embodiment, the adjustment member is a pin that contacts the head suspension at a head slider mounting region, preferably in alignment with a dimple. In another embodiment, the adjustment pin is manipulated to cause a corresponding angular reorientation in the head suspension. Manipulating the pin can include pivoting the pin about a point, translation of the pin along a plane or both. Optionally, the adjustment pin exerts a force against the head suspension resulting in movement of the head suspension to a desired position, such as fly height. Measurement of the static attitude of the head suspension may be performed prior to adjustment, after adjustment or both.

A static attitude adjustment system for adjusting the static attitude of head suspensions is also provided. The adjustment system includes a manipulatable adjustment member adapted to be placed in contact with a supported head suspension so as to exert a force against the head suspension and cause an angular reorientation of a portion of the head suspension and a heat source configured to expose at least a portion of the head suspension to heat at a predetermined intensity and duration. As a result, the adjusted static attitude of the head suspension remains after discontinuation of the heat and separation of the adjustment member. In one embodiment, the adjustment member's bottom surface in contact with the head suspension is flat, in another embodiment it is curved. The adjustment system preferably includes a heating device providing the heat source for heating the head suspension. The heat source may be infrared, laser or other heating devices.

DETAILED DESCRIPTION OF THE INVENTION

Figure 1:
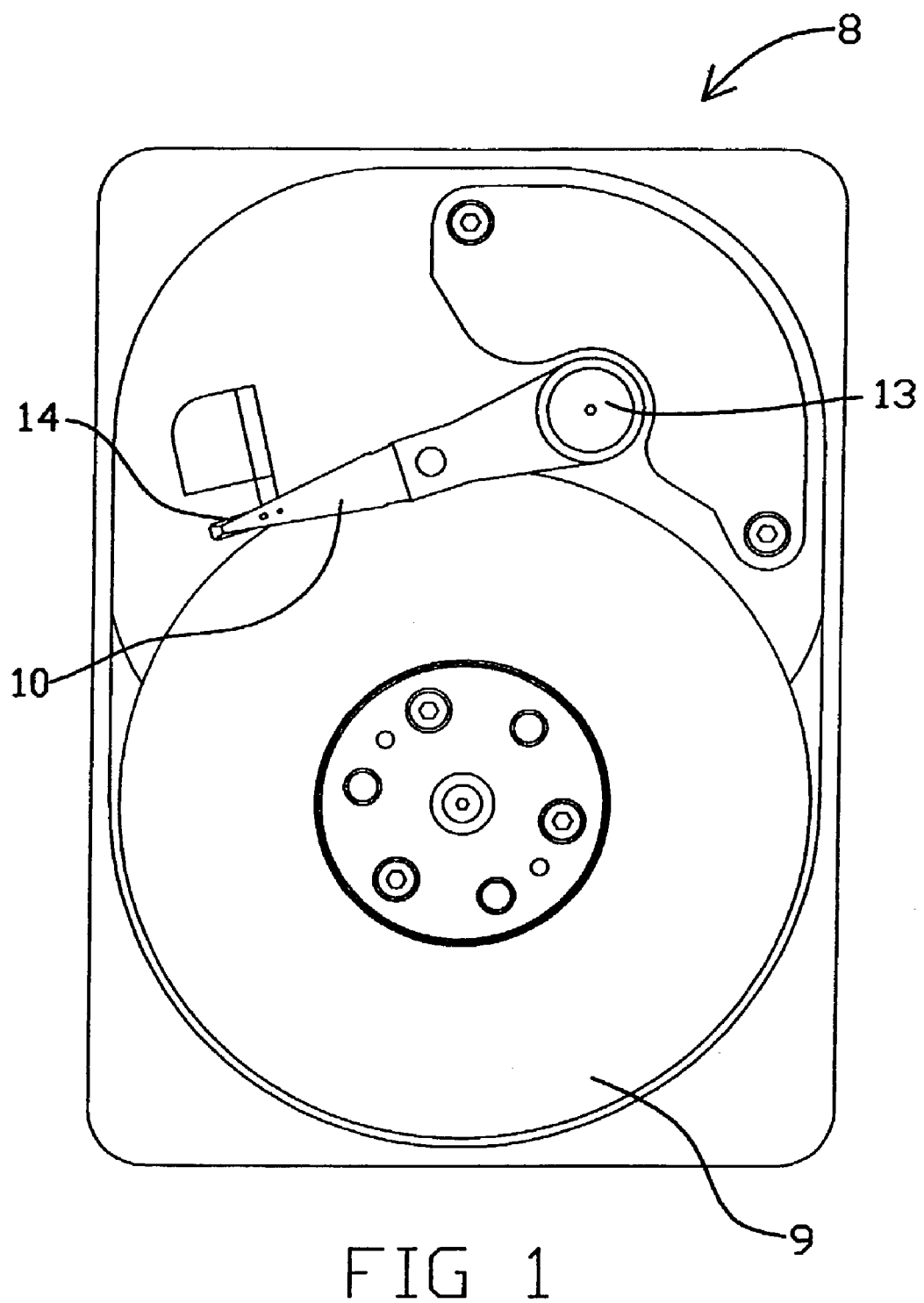
FIG. 1 is a top view of a dynamic storage device, including a head suspension.

With reference to the attached Figures, it is to be understood that like components are labeled with like numerals throughout the several Figures. FIG. 1 illustrates one embodiment of a rigid disk drive 8 including one embodiment of a head suspension 10 with which the present invention can be utilized. Head suspension 10 resiliently supports a head slider 14 at a fly height above a rigid disk 9 during operation, as described above in the Background section. Head suspension 10 is connected to a rotary actuator 13, as is known, for accessing data tracks provided on the surface of rigid disk 9. Head suspension 10 could otherwise be used with a linear type actuator, as is also well known.

Figure 2:
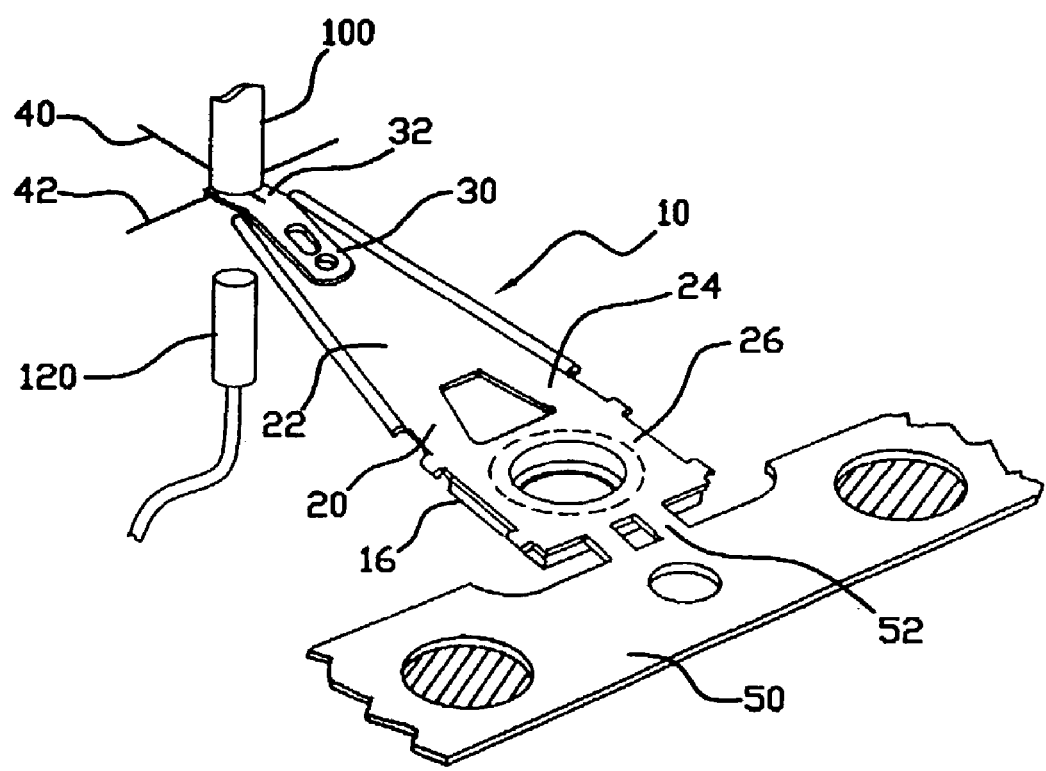
FIG. 2 is a perspective view of the head suspension of FIG. 1 along with an adjustment pin and heat source for adjustment of the head suspension in accordance with the present invention.

Referring also to FIG. 2, head suspension 10 includes a load beam 20 to which a base plate 16 is attached at a mounting region 26. A flexure 30 is attached to the load beam 20 at a rigid region 22. The load beam 20 also includes a spring region 24 located between the rigid region 22 and the mounting region 26. The flexure 30 includes a head slider mounting region 32 to which the head slider 14 is mounted (as shown in FIG. 1). Alternatively, a gimbal portion including a head slider mounting region may be provided as part of the load beam or other head suspension component, instead of on a flexure. However, all such variations are referred to herein as a flexure and head slider mounting region. A longitudinal axis 40 serves as the roll axis and a transverse axis 42 serves as the pitch axis, about which the head slider 14 may gimbal during operation of the disk drive 8. Head suspension 10 is shown attached to a carrier strip 50 by tabs 52 at the mounting region 26 of the load beam 20. The carrier strip 50 is used to transport and support multiple head suspensions during manufacturing.

As set forth above in the Background section, adjustment of the static attitude of the head suspension 10, in both the pitch and roll directions, is desirable and often necessary for proper operation of the disk drive 8. In order to accomplish this adjustment, manipulation of the head suspension 10 about the roll and pitch axes 40, 42, is commonly performed. The present invention provides a head suspension adjusting system for, and method of, performing these manipulations. In one embodiment, the present invention includes the use of an adjustment member, such as pin 100, adapted to contact the head slider mounting region 32 of the head suspension 10 and apply a force to the head suspension 10. When the force is applied, the head slider mounting region 32 may be elevated or depressed to "fly height" with respect to the base 16, as described above, however fly height is not required. Preferably, adjustment pin 100 is aligned directly over the dimple (not shown) and exerts enough force against the head slider mounting region 32 so that the head slider mounting region 32 is reoriented by orientation and/or movement of the adjustment pin 100.

A heat source 120, including but not limited to a laser, infrared beam, or other now known or later developed heat source, is positioned with respect to the head slider mounting region 32, preferably on a side of the head slider mounting region 32 which is opposite the adjustment pin 100. Once the adjustment pin 100 manipulates the head slider mounting region 32 in a desired or predetermined manner, a distal end 35 of the flexure 30, including a portion of the head slider mounting region 32, is subjected to heat from the heat source 120 to relieve stress in the flexure 30 and thereby set the part. As a result, the head slider mounting region 32 remains substantially in the configuration imparted by the adjustment pin 100 after heat is discontinued and the adjustment pin 100 is separated from the head slider mounting region 32.

Manipulation of the adjustment pin 100 while in contact with and applying a force to the head slider mounting region 32 produces a corresponding change in the attitude and orientation of the head slider mounting region 32. Various methods of manipulating the adjustment pin 100 are available to provide the desired reorientation of the head slider mounting region 32. Referring now to FIGS. 3–11, some examples of adjustment pin manipulation are shown. FIGS. 4, 6, 8 and 10 illustrate adjustment pin manipulation for roll adjustment of the head slider mounting region 32 about the roll axis 40. FIGS. 5, 7, 9 and 11 illustrate adjustment pin manipulation for pitch adjustment of the head slider mounting region 32 about the pitch axis 42. In one embodiment shown in FIGS. 4–9, the adjustment pin 100 includes a flat bottom surface 102 that contacts the head slider mounting region 32 preferably directly over a dimple 28 between the flexure 30 and the load beam 20.

Figure 3:
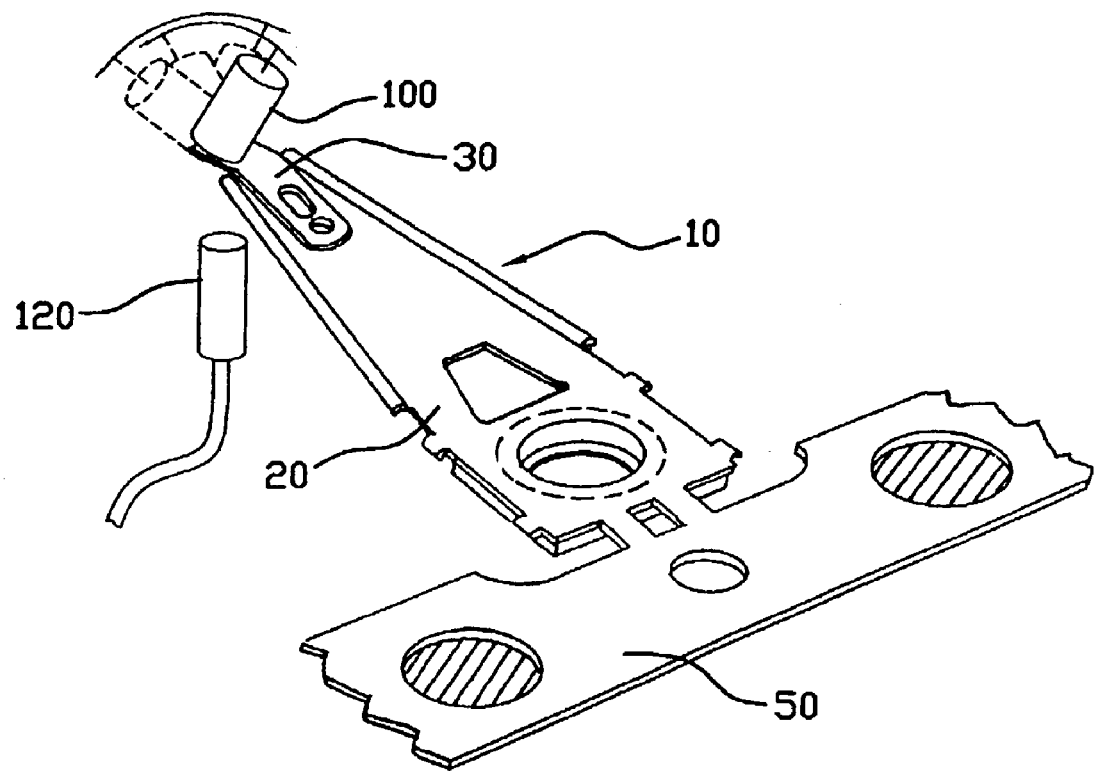
FIG. 3 is a perspective view of the head suspension of FIG. 1 illustrating pivotal movement of the adjustment pin.
Figure 4:
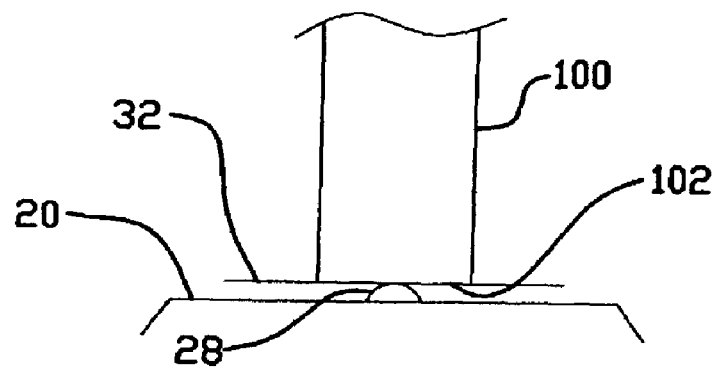
FIGS. 4, 6 and 8 are end view diagrams illustrating various roll adjustment embodiments using a first embodiment of an adjustment pin.
Figure 6:
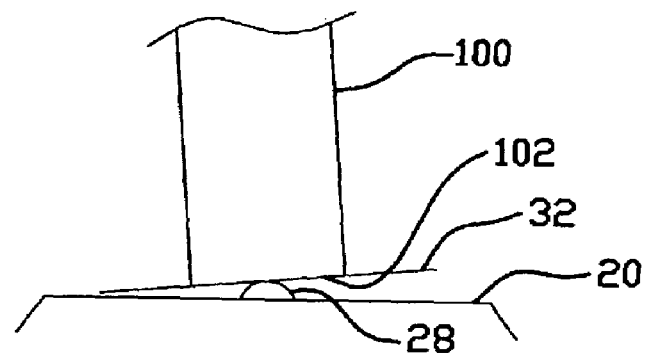
Figure 7:
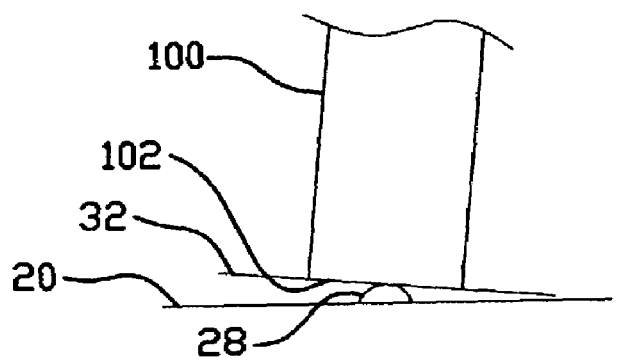

In FIGS. 6 and 7, the adjustment pin 100 is manipulated by pivoting the adjustment pin 100 about the location of the dimple 28. In this embodiment, the adjustment pin 100 remains aligned relative to the head slider mounting region 32 and dimple 28, but is free to pivot in a predetermined manner resulting in corresponding angular movement of the flexure 30 about the dimple 28, as shown. During the pivotal movement, the adjustment pin 100 remains generally orthogonal to the head slider mounting region 32 with the flat bottom surface 102 of the adjustment pin 100 generally parallel to and in contact with the head slider mounting region 32. Pivoting of the adjustment pin 100 may produce compound reorientation of the head slider mounting region 32, such that reorientation in both the roll and pitch directions occurs simultaneously. FIG. 3 illustrates this pivotal manipulation of the adjustment pin 100 relative to the head slider mounting region 32 in a static attitude adjusting system.

Figure 8:
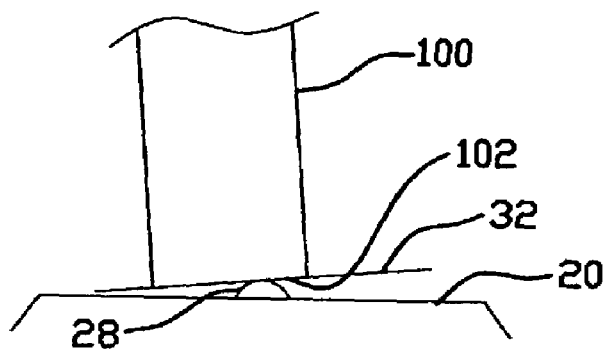
Figure 5:
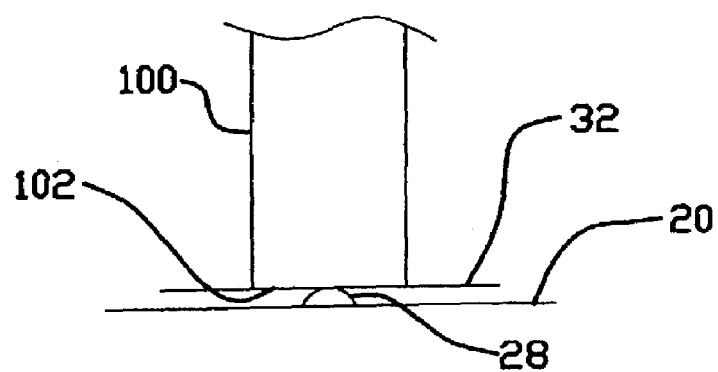
FIGS. 5, 7 and 9 are side view diagrams illustrating various pitch adjustment embodiments using the first embodiment of an adjustment pin.
Figure 9:
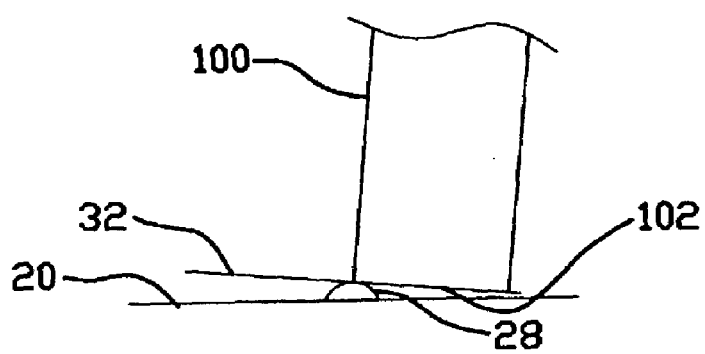

In FIGS. 8 and 9, the adjustment pin 100 is moved by translation of the adjustment pin 100 along the head slider mounting region 32 in combination with pivotal orientation of the adjustment pin 100. As a result, the adjustment pin 100 is relocated on the head slider mounting region 32 relative to the dimple 28, while the adjustment pin 100 remains generally orthogonal to the head slider mounting region 32 and the flat bottom surface 102 remains generally parallel to and in contact with the head slider mounting region 32. Compound adjustments of simultaneous pitch and roll directions are also possible.

Figure 11:
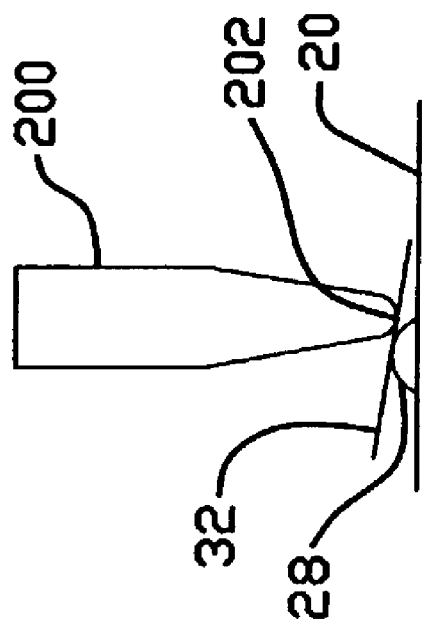
FIG. 11 is a side view diagram illustrating a pitch adjustment using the second embodiment of an adjustment pin.
Figure 10:
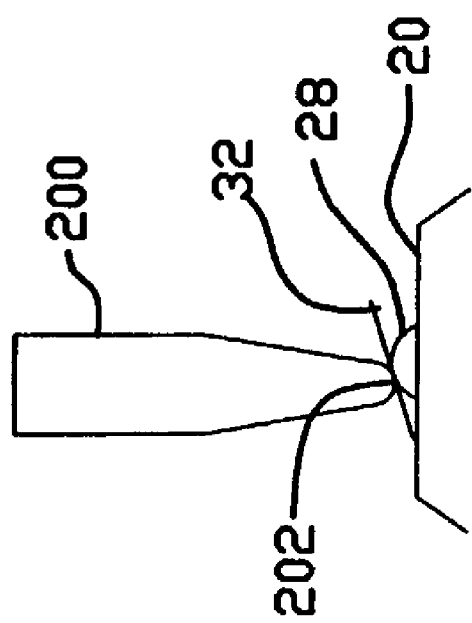
FIG. 10 is an end view diagram illustrating a roll adjustment using a second embodiment of an adjustment pin.

Referring now to FIGS. 10 and 11, another embodiment of the adjusting system of the present invention is shown wherein an adjustment member, such as pin 200, includes a generally round bottom 202 for contact with the head slider mounting region 32. Manipulation of adjustment pin 200 occurs by translation of the adjustment pin 200 along the head slider mounting region 32. In this embodiment, the adjustment pin 200 remains generally vertical, or orthogonal to the load beam 20 but not to the head slider mounting region 32. Due to the round bottom 202 of the adjustment pin 200, the adjustment pin 200 remains in generally full contact with the head slider mounting region 32. As with the previously described manipulation methods, compound adjustments of the head slider mounting region 32 are possible.

As stated above, once the adjustment pin 100, 200 has been manipulated to produce a corresponding reorientation of the head slider mounting region 32 in the pitch, roll or both directions, the distal portion 35 of the flexure 30 is subjected to heat from the heat source 120. The intensity of the heat, duration of heat exposure and area of the flexure 30 exposed to the heat may vary depending on the type of head suspension 10 being adjusted, materials of the head suspension components involved, distance between the heat source 120 and the flexure 30, amount of adjustment desired and other factors. Numerous set ups for supplying the desired heat are possible and known in the art, of which one example is shown and described.

Figure 12:
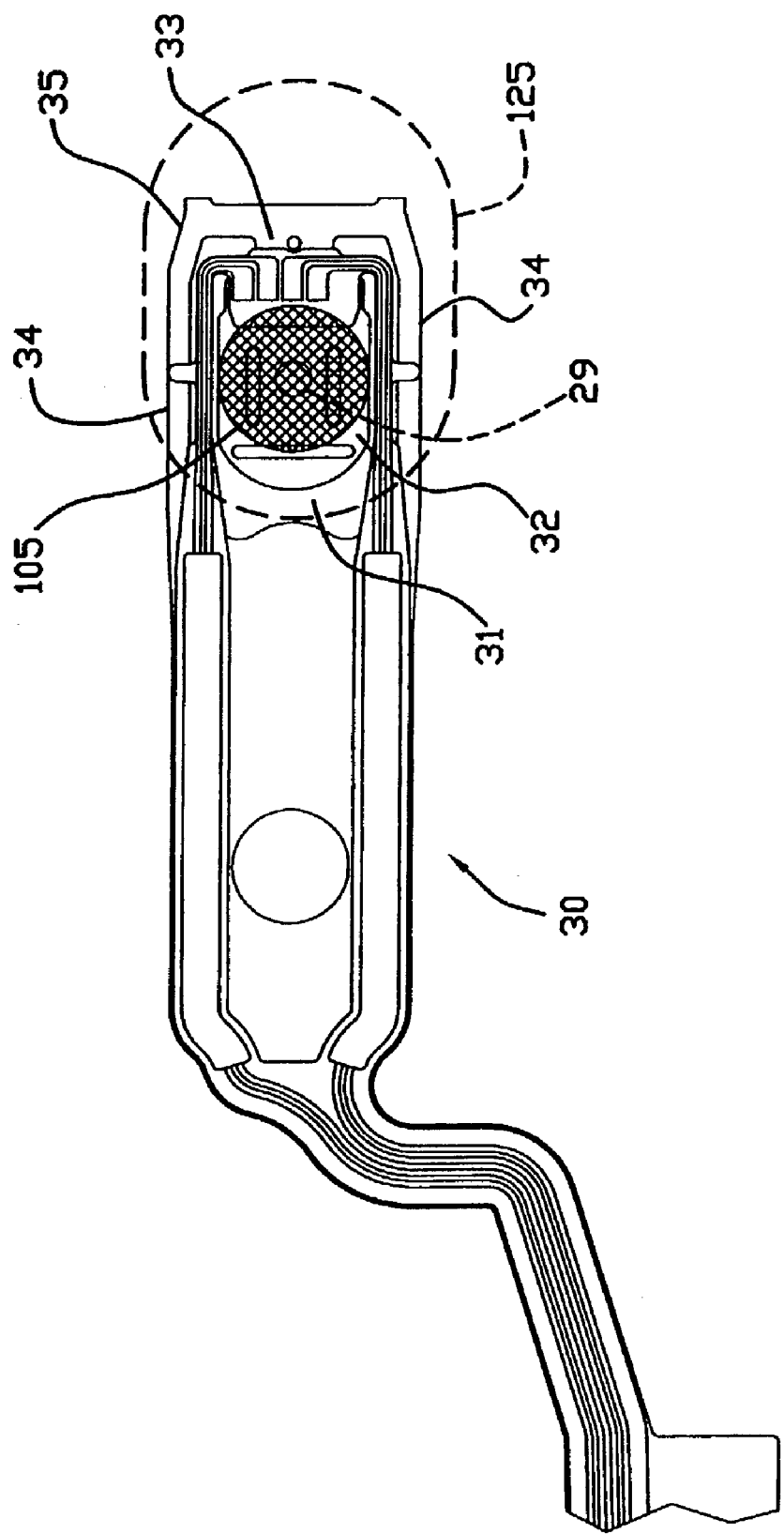
FIG. 12 is a top view of a flexure illustrating adjustment pin location and a heat application region.

In one embodiment, the heat source 120 is an infrared laser positioned to expose the flexure 30 at and around the head slider mounting region 32. Referring now to FIG. 12, the flexure 30 is shown in more detail with the head slider mounting region 32 configured as a tongue or cantilevered portion suspended within an opening 31. The head slider mounting region 32 is attached at a distal end 33 and is flanked by, but separated from, a pair of arms 34. Circular shaded area 105 represents the location and coverage of the adjustment pin 100 when preferably positioned in alignment with the dimple 28 (not shown, but represented by dimple point 29). After reorientation of the head slider mounting region 32 by manipulation of the adjustment pin 100, 200, the flexure 30 is exposed to heat via the heat source 120 in a distal area 125. Even heating of both arms 34 and their connecting structure is preferred.

Figure 13:
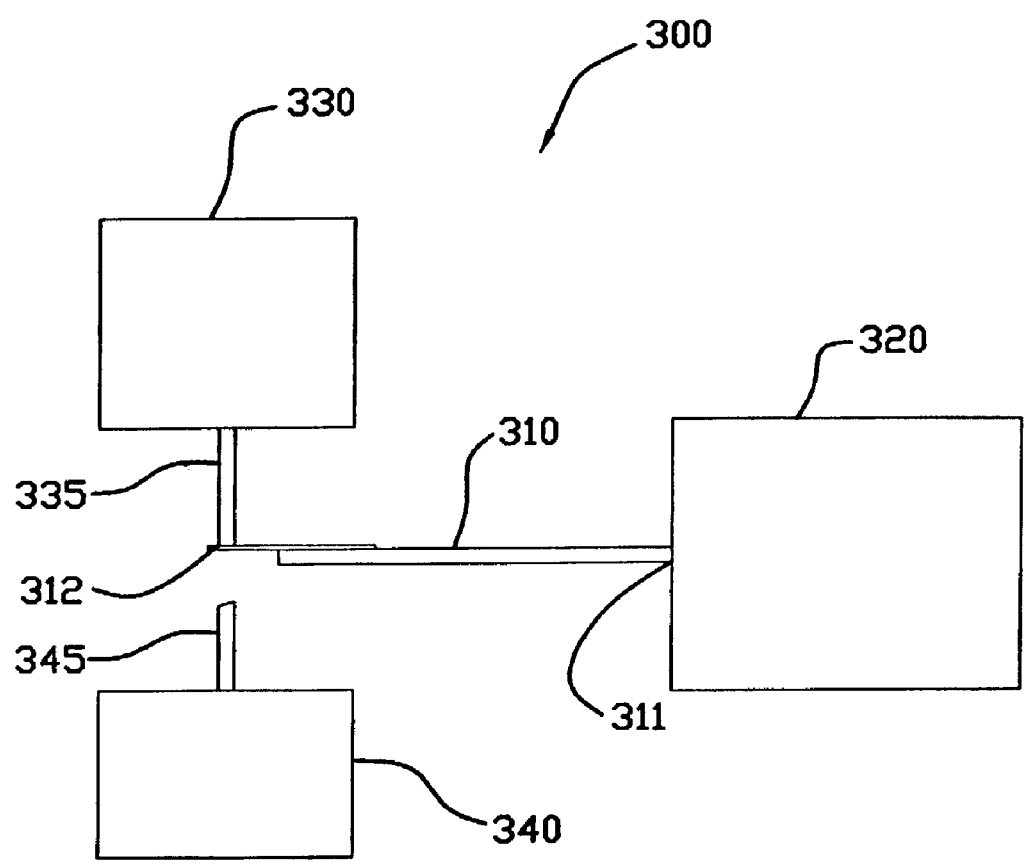
FIG. 13 is a diagram of an adjustment system in accordance with the present invention.

Referring now to FIG. 13, an adjustment member, such as pin 335, and a heat source 345 are preferably provided as part of an adjusting system 300. A support mechanism 320 is preferably provided to hold a head suspension 310 in position at a proximal end 311, such as the mounting region 26 or carrier strip 50 shown in FIGS. 2 and 3. Numerous support mechanisms 320, as are known in the art, may be used to provide support for the head suspension 310. In addition, a manipulation mechanism 330 is preferably provided for producing the various types of adjustment pin manipulation described above. Numerous types of manipulation mechanisms 330 may be used to provide pivotal orientation and/or translation of the adjustment pin 335 with respect to a head slider mounting region 312 of the head suspension 310. Additionally, a heating device 340, including the heat source 345, is preferably provided to produce the required stress relieving heat for the head suspension 310. The manipulation mechanism 330, the support mechanism 320 and heating device 340 may be independent of each other, or they may be coupled, controlled or otherwise tied together so as to provide a cohesive adjustment system 300 in accordance with the present invention for adjusting one or more head suspensions during the fabrication process. This adjustment system 300 may be used independently, or may be provided as part of an overall head suspension fabrication system, such as that described in the Girard patent (U.S. Pat. No. 5,682,780), including a static attitude measurement system.

In operation, the head suspension 310 is clamped or otherwise supported by the support mechanism 320. The manipulation mechanism 330 contacts the head slider mounting region 312 with the adjustment pin 335 using sufficient force, as described above. The manipulation mechanism 330 then manipulates the adjustment pin 335 in a pre-determined manner to cause a desired reorientation of the head slider mounting region 312. The heating device 340 then applies heat from the heat source 345 to the head slider mounting region 312 and surrounding area for a pre-determined time period, as described above. The heat is discontinued and then the adjustment pin 335 is disengaged from the head slider mounting region 312, resulting in a head suspension 310 having a desired static attitude.

Adjustment of head suspensions in accordance with the present invention may be accomplished by providing a fixed set up to the adjustment system 300. That is, the adjustment pin 335 may be set up to provide the same type of manipulation in the pitch and/or roll directions to each successive head suspension 310 introduced to the system 300. As a result, each head suspension 310 will be adjusted in the same way and to the same extent. This type of fixed adjustment is especially effective in the preliminary stages of head suspension fabrication, prior to complete assembly, gram load adjustment and/or other fabrication processes. This fixed adjustment is also used effectively when the incoming head suspensions all have the same static attitude errors.

A variable set up may also be provided using the adjustment system 300 of the present invention. That is, the adjustment system 300 may be configured to adjust head suspensions 310 automatically under computer or other type of programmable control, preferably in conjunction with a static attitude measurement system. As a result, static attitude measurement data for each individual head suspension 310 may be used to calculate the desired amount and type of pitch and roll adjustment. This information is then conveyed to the manipulation mechanism 330 and heating device 340 to produce the necessary adjustment pin 335 manipulations and heat exposure to produce the desired static attitude values. Successive measurements and adjustments may then be possible to optimize specific head suspension parts or to correct deviant parts.

In one embodiment, a preliminary static attitude measurement is made prior to adjusting the head suspension 310. Based on the measurement results, the adjustment system 300 is configured to adjust the head suspension 310 as needed. Optionally, a post-adjustment measurement may also be taken to verify the effectiveness of the adjustment. Alternatively, a head suspension 310 is adjusted with the adjustment system 300 at a preliminary configuration. A measurement is then made and the adjustment system 300 is reconfigured to modify adjustment of that same head suspension 310 or subsequent parts.

The adjustment system in accordance with the present invention is advantageous for many reasons. The adjustment pin and heat source combination requires relatively little tooling contact with the head suspension, which in turn minimizes undesirable fixture marks on the head suspension. Less tooling also reduces the cost of the adjustment system and is less complicated to design, build, maintain, operate and configure. The adjustment system of the present invention also results in minimal contact with the head suspension during static attitude adjustment. Reduced contact results in a reduction in the possibility of head suspension damage due to extreme adjustments. In addition, the minimal contact reduces the possibility of twisting of the head suspension, which may alter the radius geometry and/or the resonance characteristics of the head suspension. The simple pin design also is easier to use with ever smaller head suspension configurations, as well as those with motion limiters. The pitch and roll adjustments that result from the present invention are linear and independent of each other. As a result, the pitch and roll attitude data is easier to process for dynamic adjustment purposes.

In one aspect of the present invention, a method for adjusting static attitude of a head suspension includes providing an adjustment pin and adjusting the static attitude of a supported head suspension by contacting the head suspension with the adjustment pin to cause a predetermined attitude change in the head suspension. Thereafter, the head suspension is exposed to heat for a predetermined period. The method may include providing a heat source for producing the heat. In one embodiment, the adjustment pin includes a flat bottom surface that contacts the head suspension. In another embodiment, the flat bottomed adjustment pin contacts a head slider mounting region of the head suspension. In yet another embodiment, the adjustment pin includes a round bottom that contacts the head suspension. The adjustment pin may be aligned directly over a dimple on the head suspension. The step of contacting includes manipulating the adjustment pin to cause corresponding angular reorientation in the head suspension. Manipulating the adjustment pin may include pivoting the adjustment pin, translating the pin or both. In addition, the adjustment pin may exert a force against the head suspension during contact and may elevate or depress the head suspension to a fly height position relative to a base prior to adjustment.

In another embodiment, the method includes a step of measuring the static attitude of the head suspension to be adjusted prior to adjusting. Alternatively, the step of measuring may be performed after the step of adjusting, or before and after. In one embodiment, the method includes modifying the adjustment set up after measuring for the same or subsequent head suspensions to be adjusted.

In another aspect of the present invention, a static attitude adjustment system for head suspensions includes a manipulatable adjustment pin that may be placed in contact with a head suspension, and a heat source configured to expose at least a portion of the head suspension to heat in a predetermined manner. The system may include a manipulation mechanism for the adjustment pin that is configured to pivot the adjustment pin about a point, translate the adjustment pin or both. The system may also include a support mechanism for clamping or supporting the head suspension during adjustment, and a heating device that includes the heat source for providing a desired time and intensity of heat. The heat source may be a laser or infrared source.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A method for adjusting static attitude of a head suspension having a flexure with a slider mounting region supported by spring arms, the method comprising the steps of:

providing an adjustment member; and adjusting the static attitude of a supported head suspension by contacting the slider mounting region of the head suspension flexure with the adjustment member and manipulating the adjustment member to reorient the slider mounting region to cause a predetermined attitude change in the head suspension, and exposing the head suspension flexure, including the spring arms, to heat in a predetermined manner while the adjustment member is in contact with and reorienting the slider mounting region.

2. The method of claim 1, further comprising the step of providing a heat source for producing the heat.

3. The method of claim 1, wherein the adjustment member comprises a flat bottom surface that contacts the head suspension.

4. The method of claim 3, wherein the step of adjusting comprises contacting the flat bottom surface of the adjustment member to the head slider mounting region of the head suspension.

5. The method of claim 1, wherein the adjustment member comprises a curved bottom surface that contacts the head suspension.

6. The method of claim 1, wherein the step of adjusting further comprises aligning the adjustment member directly over a dimple on the head suspension.

7. The method of claim 1, wherein the step of adjusting by contacting comprises manipulating the adjustment member to cause corresponding angular reorientation in the slider mounting region of the head suspension flexure.

8. The method of claim 7, wherein the step of manipulation further comprises pivoting the adjustment member with a resulting angular reorientation of the head suspension due to application of an angular force exerted by the pivoted adjustment member against the slider mounting region of the head suspension flexure.

9. The method of claim 7, wherein the step of manipulation further comprises translating the adjustment member with a resulting angular reorientation of the head suspension due to a force exerted by the translated adjustment member against a different location on the head suspension.

10. The method of claim 7, wherein the step of manipulation further comprises pivoting and translating the adjustment member.

11. The method of claim 1, wherein the step of adjusting further comprises exerting a force from the adjustment member to the slider mounting region of the head suspension flexure during contact.

12. The method of claim 11, wherein the step of exerting a force further comprises changing an elevation of the head suspension to a fly height position relative to a base prior to adjustment of the head suspension.

13. The method of claim 1, wherein the adjusting member comprises a pin.

14. The method of claim 1, wherein exposing the head suspension flexure to heat results in setting the head suspension by relieving stress in the head suspension, such that the head suspension remains substantially in the configuration imparted by the adjustment member after heat is discontinued and the adjustment member is separated from the head suspension.

15. The method of claim 1, wherein the step of exposing the head suspension to heat in a predetermined manner comprises setting heat intensity, a duration of heat exposure and an area of the head suspension exposed to heat.

16. The method of claim 1, further comprising the steps of supporting the head suspension prior to contacting the head suspension with the adjusting member, exposing the head suspension to heat while the adjustment member is still contacting the head suspension, and then separating the adjustment member from the head suspension once the adjustment is complete.

17. The method of claim 1, further comprising the step of measuring the static attitude of the head suspension prior to adjusting.

18. The method of claim 17, further comprising the step of modifying a set up for the step of adjusting after measuring.

19. The method of claim 1, further comprising the step of measuring the static attitude of the head suspension after adjusting.

20. The method of claim 19, further comprising the step of modifying a set up for the step of adjusting after measuring.

21. The method of claim 1, further comprising the steps of measuring the static attitude of the head suspension prior to adjusting and measuring the static attitude of the head suspension after adjusting.

22. The method of claim 21, further comprising the step of modifying a set up for the step of adjusting after one or both steps of measuring.

* * * * *